(12) United States Patent
Solland

(10) Patent No.: US 9,605,698 B2
(45) Date of Patent: Mar. 28, 2017

(54) ELECTRONIC DEVICE AND HOLDING ELEMENT

(71) Applicants: BEIJING LENOVO SOFTWARE LTD., Beijing (CN); LENOVO (BEIJING) LIMITED, Beijing (CN)

(72) Inventor: Kurt Solland, Beijing (CN)

(73) Assignee: BEIJING LENOVO SOFTWARE LTD., Beijing (CN)

( * ) Notice: Subject to any disclaimer, the term of this patent is extended or adjusted under 35 U.S.C. 154(b) by 130 days.

(21) Appl. No.: 14/500,426

(22) Filed: Sep. 29, 2014

(65) Prior Publication Data

US 2015/0138698 A1    May 21, 2015

(30) Foreign Application Priority Data

Nov. 19, 2013  (CN) .............................. 2013 0 585857
Feb. 19, 2014  (CN) ........................... 2014 1 0056814

(51) Int. Cl.
*F16B 2/22*     (2006.01)
*G06F 1/16*     (2006.01)

(52) U.S. Cl.
CPC ................ *F16B 2/22* (2013.01); *G06F 1/16* (2013.01); *G06F 1/1626* (2013.01); *G06F 1/1628* (2013.01); *Y10T 24/44991* (2015.01)

(58) Field of Classification Search
CPC . F16B 2/22; G06F 1/16; G06F 1/1628; G06F 1/1626; Y10T 24/44991
See application file for complete search history.

(56) References Cited

U.S. PATENT DOCUMENTS

| 5,128,662 A * | 7/1992 | Failla ..................... G06F 1/1601 248/924 |
| 6,267,236 B1 * | 7/2001 | Seok ..................... A45C 13/002 206/320 |
| 6,424,387 B2 * | 7/2002 | Sato .............................. 349/171 |
| 6,498,597 B1 * | 12/2002 | Sawano .................. G09F 11/29 345/107 |

(Continued)

*Primary Examiner* — David M Sinclair
*Assistant Examiner* — Theron S Milliser
(74) *Attorney, Agent, or Firm* — Sills Cummis & Gross P.C.

(57) ABSTRACT

The present disclosure discloses an electronic device and a connecting part. An electronic device according to an embodiment of the present disclosure comprises: a connecting part comprising a lateral portion, a bottom portion connected to a first end face of the lateral portion, and a top portion connected to a second end face on the lateral portion opposite to the first end face, the top portion being arranged opposite to the bottom portion so that an accommodating space is formed by the bottom portion, the lateral portion and the top portion; and N electronic accessories each comprising a body, an accommodated portion, and a flexible portion connecting the body to the accommodated portion, where N is greater than or equal to 1; wherein when accommodated portions of the N electronic accessories are placed in the accommodating space, the flexible portion of at least one of the N electronic accessories deforms under an external force, so that body of the at least one electronic accessory can rotate with respect to an end face on the bottom portion or the top portion away from the lateral portion, to change the position of the body with respect to the accommodated portion.

23 Claims, 6 Drawing Sheets

(56) References Cited

U.S. PATENT DOCUMENTS

| | | | | |
|---|---|---|---|---|
| 6,762,929 B2* | 7/2004 | Sawyer | G06F 1/1601 | 248/535 |
| 6,876,143 B2* | 4/2005 | Daniels | H01L 27/14627 | 257/E27.15 |
| 7,184,086 B2* | 2/2007 | Tamura | H04N 5/2251 | 348/333.06 |
| 7,672,117 B1* | 3/2010 | Gary | G06F 1/1616 | 206/320 |
| 7,772,504 B1* | 8/2010 | Tashjian | G06F 1/1628 | 174/380 |
| 8,047,365 B1* | 11/2011 | Lin | A45C 13/02 | 206/320 |
| 8,253,518 B2* | 8/2012 | Lauder | G06F 1/1647 | 206/320 |
| 8,766,921 B2* | 7/2014 | Ballagas | G06F 1/1626 | 345/168 |
| 8,989,826 B1* | 3/2015 | Connolly | A45C 1/06 | 361/679.01 |
| 9,174,764 B2* | 11/2015 | Kang | B65D 5/5206 | |
| 2001/0008582 A1* | 7/2001 | Sato | G02F 1/133348 | 396/429 |
| 2002/0054030 A1* | 5/2002 | Murphy | G06F 1/1626 | 345/173 |
| 2003/0048256 A1* | 3/2003 | Salmon | G06F 1/1613 | 345/168 |
| 2003/0100338 A1* | 5/2003 | Lee | G06F 1/1626 | 455/556.2 |
| 2004/0070633 A1* | 4/2004 | Nakamura | G06F 3/1423 | 715/860 |
| 2005/0162824 A1* | 7/2005 | Thompson | G06F 1/1632 | 361/679.41 |
| 2006/0038745 A1* | 2/2006 | Naksen | G06F 1/1624 | 345/30 |
| 2006/0244728 A1* | 11/2006 | Finke-Anlauff | G06F 1/1628 | 345/168 |
| 2007/0035917 A1* | 2/2007 | Hotelling | G06F 1/1632 | 361/679.56 |
| 2007/0225031 A1* | 9/2007 | Bodkin | A45C 3/001 | 455/550.1 |
| 2008/0303782 A1* | 12/2008 | Grant | G06F 1/1615 | 345/156 |
| 2009/0124308 A1* | 5/2009 | Lee | G06F 1/1626 | 455/575.3 |
| 2010/0117975 A1* | 5/2010 | Cho | G06F 1/1626 | 345/173 |
| 2010/0238119 A1* | 9/2010 | Dubrovsky | G06F 1/1626 | 345/169 |
| 2012/0043247 A1* | 2/2012 | Westrup | A45C 3/02 | 206/472 |
| 2012/0194448 A1* | 8/2012 | Rothkopf | A45C 13/002 | 345/173 |
| 2013/0050164 A1* | 2/2013 | Rericha | G06F 1/1626 | 345/205 |
| 2013/0069879 A1* | 3/2013 | Lin | G06F 1/16 | 345/168 |

* cited by examiner

ELECTRONIC DEVICE AND HOLDING ELEMENT

CROSS REFERENCE TO RELATED APPLICATIONS

This application claims priority from Chinese National Application Nos. 201310585857.X filed on Nov. 19, 2013, and 201410056814.7 filed on Feb. 19, 2014, the contents of which are incorporated herein by reference.

BACKGROUND

Technical Field

The present disclosure relates to the field of electronic technology, and in particular, to electronic devices and a holding element.

Related Art

With the development of science and technology, increasing electronic devices, such as, smart phones, tablets, notebooks, smart televisions etc., are introduced to people's lives. These electronic devices bring great convenience to people's lives, and have become an indispensable part of people's lives.

At present, taking a tablet as an example, an input operation may generally be performed on the tablet through a virtual keyboard. However, due to the limitation of the virtual keyboard and higher requirements on user experience, a physical keyboard which can be externally connected to the tablet is presented. A user may perform the input operations through a physical keyboard. Most of the physical keyboards are fixed and connected to the tablet through cooperation between a hook and a bayonet.

However, the inventor of the present application discovers that at least the following technical problems exist in the above technology in the process of implementing the technical solutions in the embodiments of the present disclosure: as the fixed connection between the tablet and the physical keyboard needs the cooperation between the bayonet and the hook, the bayonet and the hook need to be arranged on the tablet and the physical keyboard, respectively. Therefore, there is a technical problem that a structure of the electronic device is complex.

In addition, in order to meet people's various requirements, forms of the electronic devices become increasingly diverse. An existing electronic device generally includes a main body having a display function, a holding portion, and a flexible portion connecting the holding portion and the main body. When in use, the main body, the holding portion and the flexible portion may be located in the same plane; or a force may be applied so that the flexible portion deforms and the holding portion can rotate with respect to the main body.

However, the inventor of the present application at least discovers that the following technical problems exist in the above existing technology in the process of implementing the technical solutions of the present application: when a video is played using the above electronic device, the electronic device is needed to be hold in hand, thereby limiting the activity of the user's hands.

SUMMARY

In order to solve at least some of the above technical problems, in a first aspect of the present disclosure, embodiments of the present disclosure provide a holding element configured to hold an accessory on an electronic device, the holding element comprising: an accommodating groove configured to receive at least a part of the accessory to hold the accessory on the electronic device, wherein at least a part of the holding element rising up from the electronic device.

In addition, in order to solve at least some of the above technical problems, in a second aspect of the present disclosure, the embodiments of the present disclosure provide an electronic device, comprising: a main body; and a holding element arranged on a first side of the main body, with at least a part of the holding element rising up from a first surface of the main body, wherein the holding element is configured to hold an accessory on the main body.

In addition, in order to solve at least some of the above technical problems, in a third aspect of the present disclosure, the embodiments of the present disclosure provide an electronic device, comprising: a main body having a protrusion part formed on its first surface; and N electronic accessories each comprising a body, a fixed portion, and a flexible portion which connects the body to the fixed portion, where N is greater than or equal to 1 and the fixed portion is fixed to the main body; wherein the flexible portion of at least one of the N electronic accessories deform at a position corresponding to an outer edge of the protrusion part of the main body under an external force, so that bodies of the at least one electronic accessory can rotate, with respect to the main body, about the outer edge of the protrusion part as an axis, to change the position of the body with respect to the main body.

BRIEF DESCRIPTION OF THE DRAWINGS

In order to illustrate technical solutions in the embodiments of the present disclosure or the related art more clearly, accompanying drawings needed to be used in the description of the embodiments will be described below in brief. Obviously, the accompanying drawings described below are merely some embodiments of the present disclosure.

DETAILED DESCRIPTION OF THE EMBODIMENTS

Embodiments of the present application provide an electronic device, to solve the technical problem in the related art that a structure of the electronic device is complex.

In order to solve the above problem that a structure of the electronic device is complex, a general concept is proposed as follows in some embodiments of the present application.

An electronic device includes: at least one electronic element, including at least a first element; a main body, in which the at least one electronic element is arranged, a first part of the first element being exposed on a first surface of the main body; and a bearing structure arranged on a first side of the main body, a height value of the first side being greater than height values of remaining parts of the main body excluding the first side, wherein the bearing structure supports an accessory on the first side of the main body when the accessory is placed on the main body. That is, once an accessory such as a physical keyboard, a protective cover etc. is directly placed on the main body to be supported by the bearing structure, the accessory can be physically connected to the electronic device, without adding other connection structures. Therefore, it effectively solves the technical problem in the related art that a structure of the electronic device is complex. Further, a new form of electronic device with a simple structure and beautiful design appearance is provided, improving user experience. In addition, when the electronic device is perpendicular to the ground or is at an angle greater than 45 degree with respect to the ground, the bearing structure can support the accessory, so that the accessory will not slip off and separate from the first surface of the electronic device, improving user experience.

Some technical solutions of the present disclosure will be described in detail below in conjunction with accompanying drawings and specific embodiments. It should be understood that, the embodiments of the present disclosure and the specific features in the embodiments are indented to specifically describe the technical solutions of the disclosure, instead of limiting the technical solutions of the disclosure. The embodiments of the present disclosure and the technical features in the embodiments can be combined with each other without conflict.

Figure 1:
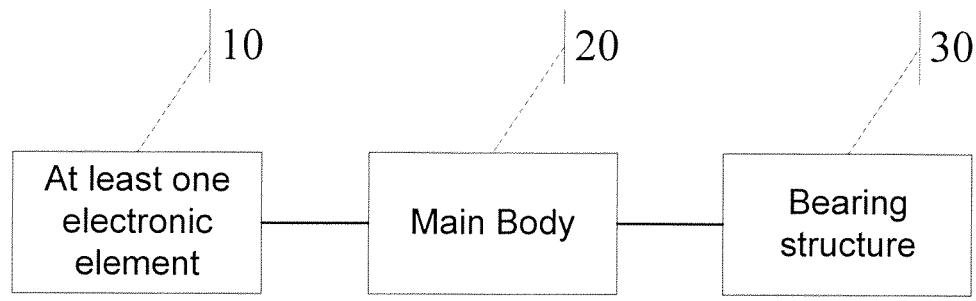
FIG. 1 is a functional block diagram of an electronic device according to an embodiment of the present disclosure.

In an aspect of the present disclosure, an electronic device according to some embodiments is provided. The electronic device may be a smart phone, a tablet, an ultrabook etc. As shown in FIG. 1, the electronic device includes: at least one electronic element 10, including at least a first element; a main body 20, in which the at least one electronic element is arranged, a first part of the first element being exposed on a first surface of the main body; and a bearing structure 30 arranged on a first side of the main body 20, a height value of the first side being greater than height values of remaining parts of the main body 20 excluding the first side, wherein the bearing structure 30 supports an accessory on the first side of the main body 20 when the accessory is placed on the main body 20.

In the present embodiment, the at least one electronic element 10 may be elements which are needed to implement various functions by the electronic device, for example, a mainboard, a display screen, a network adapter, a power module, a CPU, a graphics card etc. This is not specifically limited in the present application.

Further, the above first element may be a display component, i.e., including elements which implement a display function such as a display unit, a graphics card etc. Then, the first part may be a display unit. Of course, the display component may also include a touch unit. This is not specifically limited in the present application.

In practical applications, the above accessory may be a physical keyboard, or a sheet-type protective cover of the electronic device. When the accessory is a sheet-type protective cover, at least one input/output means such as a touch panel, a display screen etc. may be arranged on the accessory. The sheet-type protective cover may be made of a flexible material.

The main body 20 will be described below.

Figure 2A:
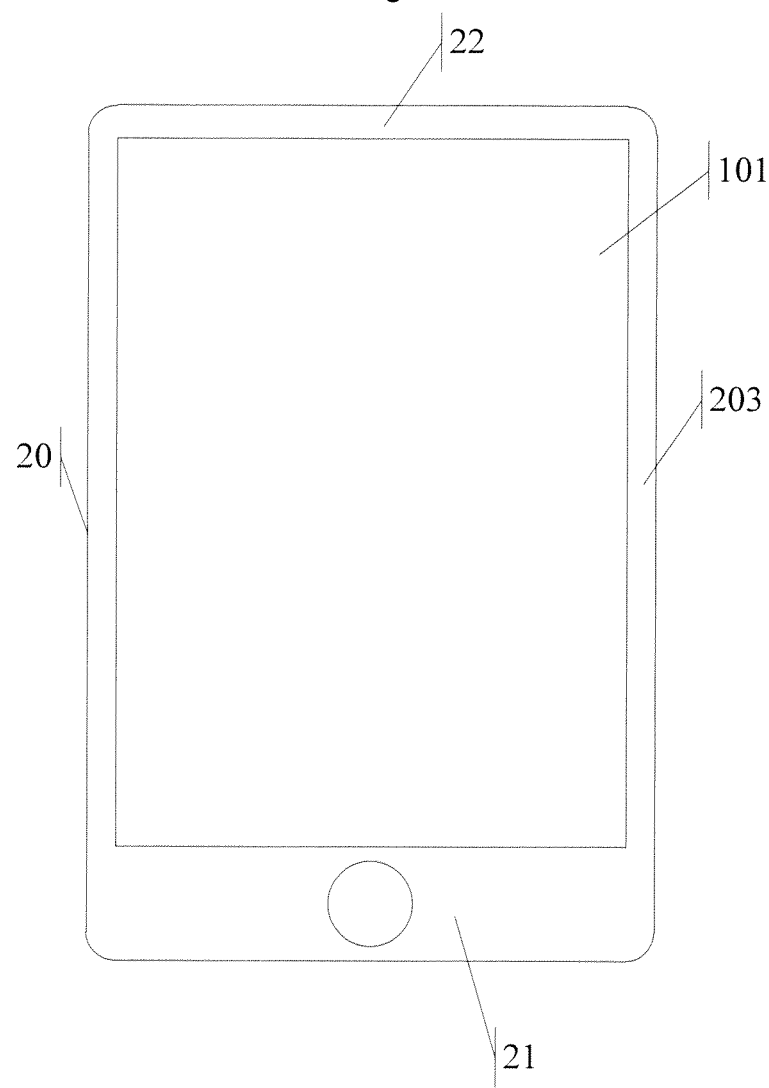
FIGS. 2A-2B are structural schematic diagrams of a main body according to an embodiment of the present disclosure.
Figure 2B:
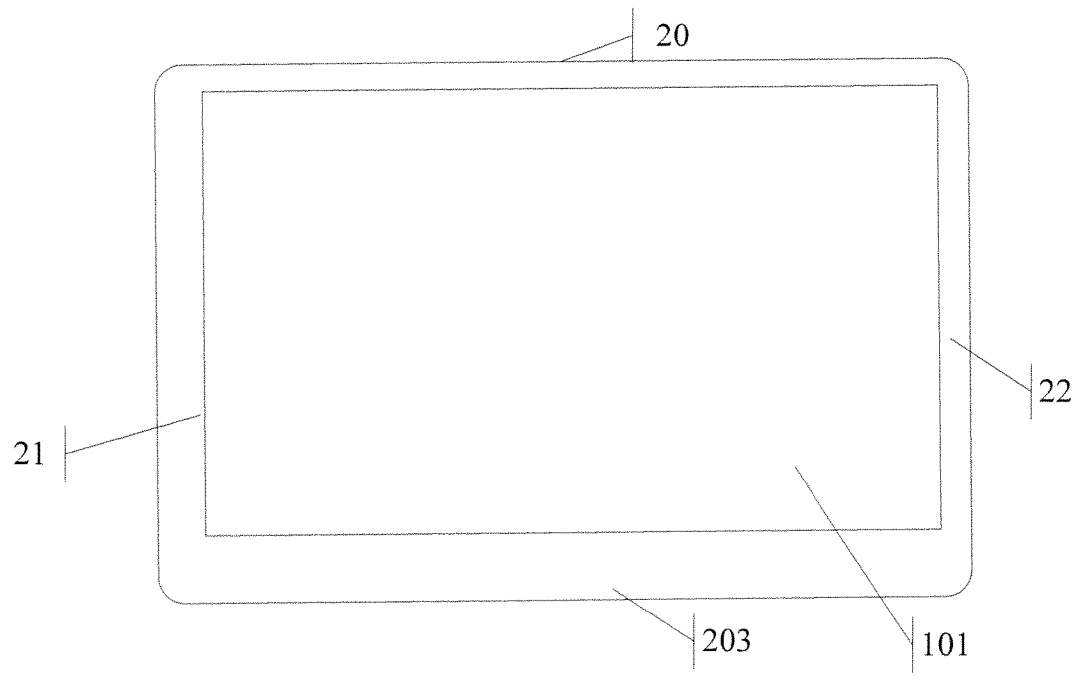

The main body 20 includes at least a first side and a second side opposite to the first side. In an example, as shown in FIG. 2A, when the electronic device is a smart phone, the first side 21 is a side of a short edge towards a user when the user holds the smart phone in hand at long edges. Then the second side 22 is a side of a short edge away from the user in this condition. In another example, as shown in FIG. 2B, when the electronic device is a tablet, the first side 21 is a side towards a user when the user holds the tablet in hand, and then the second side 22 is a side away from the user in this condition. Of course, in practical applications, depending on difference in forms of the electronic devices, orientations of the first side 21 and the second side 22 are also different. This is not specifically limited in the present application. Further, a height value of the first side 21 may be greater than height values of other parts on the main body 20. That is, in some embodiments, the first side 21 is the thickest part on the main body 20.

Further, also with reference to FIGS. 2A and 2B, a display unit 101 is exposed on a first surface 203 of the main body 20.

Further, a bearing structure 30 is arranged on the first side 21 of the main body 20. When an accessory such as a physical keyboard, a protective cover etc. is placed on the main body 20, the bearing structure 30 can prevent the accessory from sliding with respect to the main body in a direction from the second side 22 to the first side 21.

In a specific implementation, the bearing structure may include but is not limited to the following two structures.

In a first structure, the bearing structure may be comprised of an accommodating groove of an accommodating portion formed on the first side 21. An opening of the accommodating groove is facing towards the first surface 203. In practical applications, the accommodating groove may be of various shapes, for example, a "U" shape, an "L" shape etc. Therefore, when an accessory can be inserted into the accommodating groove, the accessory is fixed with respect to the main body. That is, the position of the accessory with respect to the main body 20 is unchanged.

Figure 3A:
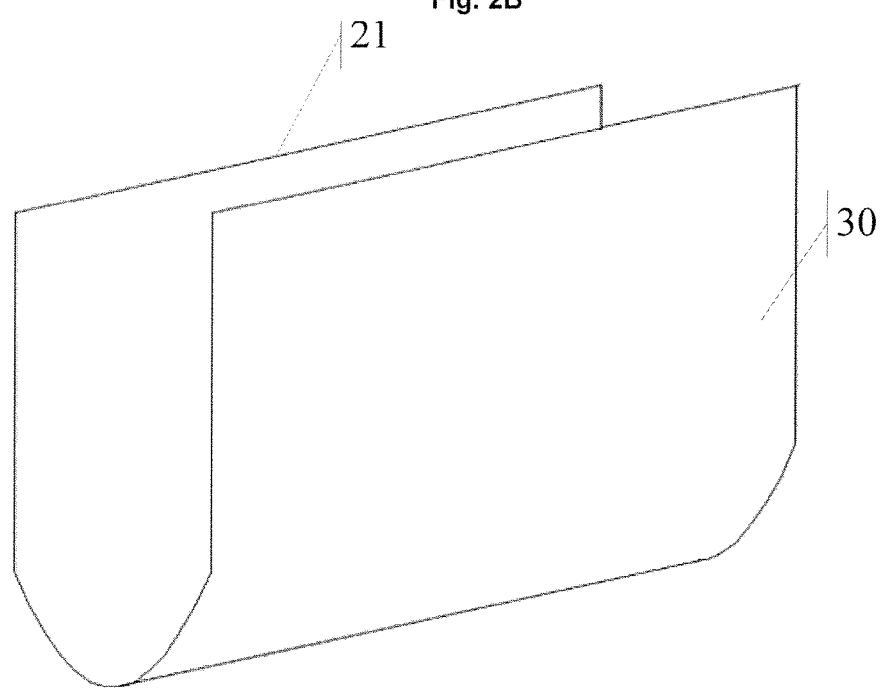
FIGS. 3A-3C are structural schematic diagrams of a bearing structure according to an embodiment of the present disclosure.
Figure 3B:
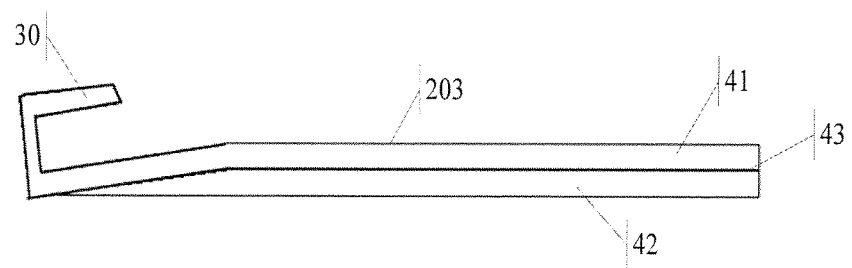

In the present embodiment, the bearing structure 30 may be separably or fixedly connected to the main body 20. Specifically, the bearing structure 30 may be as shown in FIG. 3A. A connecting part such as a magnet may be arranged on an end of the bearing structure 30. When in use, the bearing structure 30 may be connected to the main body using the connecting part. Alternatively, as shown in FIG. 3B, the bearing structure 30 is a "U" shaped structure, which is formed by a middle frame 4 arranged at a connection position between a front housing 41 and a rear housing 42 of the main body 20 extending from the first side 21 in a direction perpendicular to the first surface 203 over a distance and then extending towards the second side 22. Of course, the bearing structure 30 may be integrally formed with a rear housing of the main body 20. This is not specifically limited in the present application.

In a specific implementation, regardless of whether the bearing structure is separable from the main body 20, a fastener, such as a magnet, a locating clip, a friction fixed block etc., is arranged in the bearing structure. When a user inserts an accessory into the accommodating groove, the fastener can fix the accessory, to enable the accessory to be unplugged from the accommodating groove only if it is subjected to a large external force.

For example, if the bearing structure 30 is inseparable from the main body 20, a friction fixed block made of a flexible material with a certain friction coefficient is arranged on an inner wall of an opening of the accommodating groove of the bearing structure 30. When the user inserts one or more accessories of the same thickness as the opening of the accommodating groove into the accommodating groove, it is not easy for the accessories to slide from the accommodating groove due to the friction action of the friction fixed block on surfaces of the accessories.

Figure 3C:
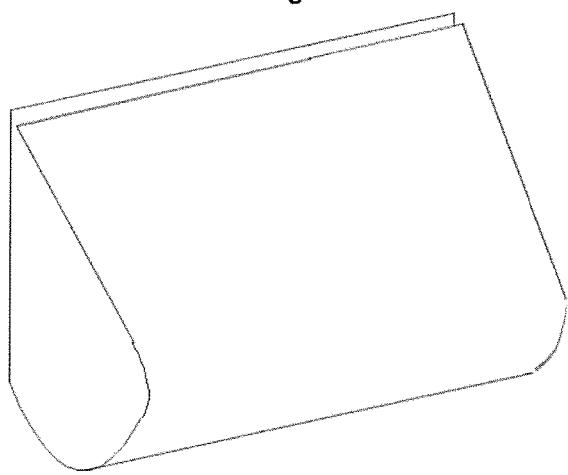

Of course, the bearing structure per se may play a role in fastening. For example, the opening of the accommodating groove of the bearing structure is closed, or has a small gap, as shown in FIG. 3C.

For example, when in use, if the bearing structure 30 is separable from the main body 20, the user may pull the opening of the accommodating groove open in hand to cause a gap to become larger, and then the user can insert the accessories and the main body 20 into the accommodating groove. When the user looses his/her hands, the accessories and the main body 20 can be stuck in the opening of the accommodating groove. Thereby, both the accessories and the main body 20 are fixed with respect to each other and are not easy to be separated.

In the present embodiment, data transmission means is arranged in the accommodating groove. When an accessory is inserted into the accommodating groove, the data transmission means is connected to transmission means on the accessory, and thereby data transmission can be implemented between the electronic device and the accessory.

Figure 4:
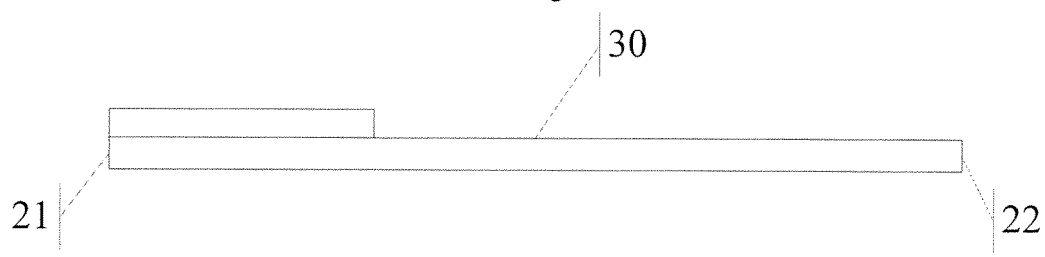
FIG. 4 is a structural schematic diagram of a bearing structure according to an embodiment of the present disclosure.

In a second structure, the bearing structure 30 may be a protrusion. As shown in FIG. 4, the protrusion may be cuboid or wedge-shaped, and extends from the first side 21 to the second side 22 of the main body 20, so that the height value of the first side is greater than height values of remaining parts of the main body excluding the first side. Then an edge of the accessory may be placed on the protrusion, so that the accessory cannot slide with respect to the main body in a direction from the second side 22 to the first side 21.

Of course, in practical applications, the bearing structure 30 is not limited to the above two structures. The bearing structure 30 may be set by those skilled in the art themselves, and are not specifically limited in the present application.

Further, the electronic device may further include a processor connected to the display component to control the display interface of the display unit.

Specifically, when the above accessory is a keyboard comprised of N physical keys, the keyboard may be located on the display unit, and may cover a part of a display area. At this time, the processor may control the display unit to switch from a first display interface to a second display interface, where N is an integer greater than or equal to 1, and the second display interface is an input interface of the keyboard.

Figure 5:
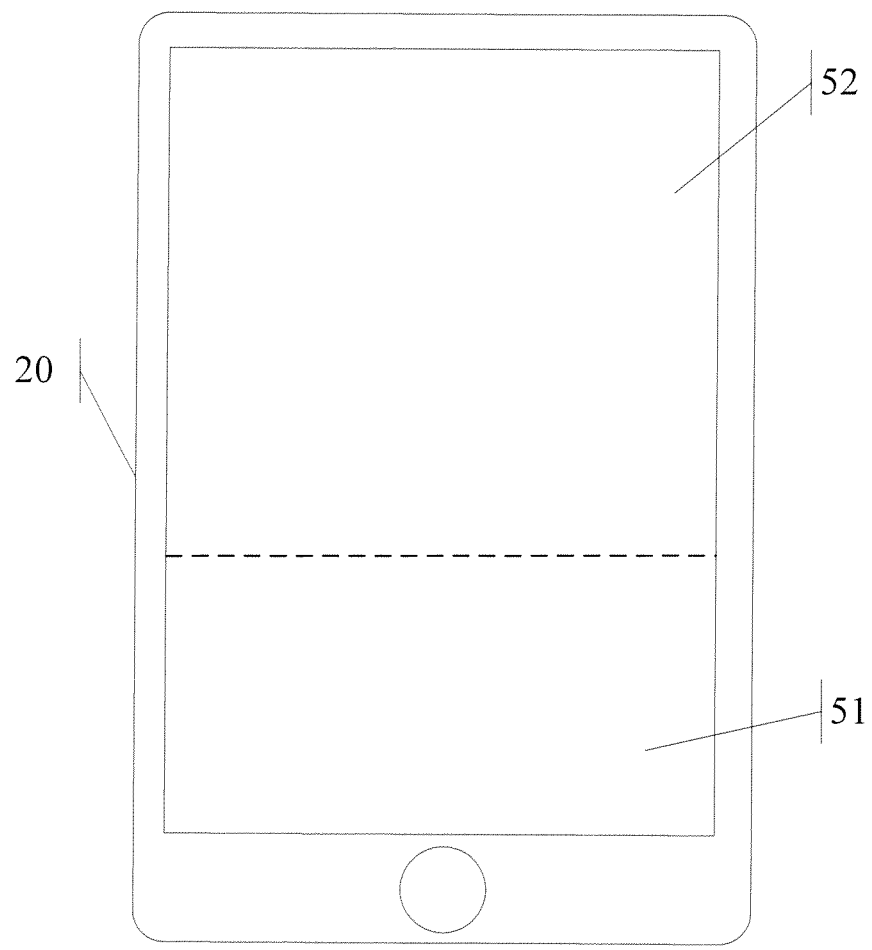
FIG. 5 is a diagram of a display interface according to an embodiment of the present disclosure.

For example, the first display interface may be a full-screen display interface, and the second display interface may be an input interface of the keyboard, as shown in FIG. 5. The second display interface includes two areas, i.e., a first area 51 and a second area 52. All contents in the first display interface are displayed in the second area 52. When the electronic device detects that the keyboard is located on the display unit, the processor may control the display unit to switch from the first display interface to the second display interface.

At this time, the first area 51 of the second display interface is blocked by the keyboard, so that a backlight of a display area on the display unit corresponding to the first area 51 can transmit through a light-transmission area of the keyboard.

Specifically, the keyboard has a light-transmission area. The light-transmission area may be a character area of various keys on the keyboard and may be made of a transparent material. When the keyboard blocks the first area 51 of the second display interface, the backlight of the display area on the display unit corresponding to the first area 51 can transmit through the above light-transmission area, so that a user can clearly see the characters on the keyboard in a dark environment, so as to perform an input operation.

In the present embodiment, the keyboard is placed over the first area 51, and blocks the first area 51. A size of the first area 51 may be the same as or greater than that of the keyboard, which is not specifically limited in the present application.

Preferably, a light sensor may be arranged on the electronic device, to capture ambient light information in an environment where the electronic device is located. Thereby, the processor may control brightness of the display area according to the information captured by the light sensor. This enables the user to clearly see the characters on the keyboard in different environments.

In the present embodiment, there may be M virtual contact points on the first area 51. When an input operation is performed on the physical keys of the keyboard, the physical keys are pressed by an external force and contact the virtual contact points, so that the electronic device can acquire the input operation, where M is an integer greater than or equal to 1.

Specifically, a physical contact point may be arranged on each physical key of the keyboard. When a user performs an input operation by clicking on the physical key, the physical key is pressed towards the display unit, until the physical contact point contacts with the virtual contact. At this time, the electronic device determines which key the user clicks on according to a charge change at the virtual contact, and in turn determines which character the user inputs, i.e., acquiring the input operation of the user.

Of course, a communication module may also be arranged on the keyboard, such as a Bluetooth module, a Near Field Communication (NFC) module etc. A corresponding electronic device may also be arranged with a communication module. In this way, the keyboard may transmit an input operation of the user to the electronic device, to enable electronic device to further respond to the user's operation.

In another embodiment, the above communication module may also be used to transmit other data in addition to the input operation. This is not specifically limited in the present application.

In a specific embodiment, in addition to the above wireless communication mode, data transmission means may also be arranged on the bearing structure 30. For example, when the bearing structure 30 is comprised of an accommodating groove, multiple legs are arranged at the bottom portion of the accommodating groove. Thereby, after an accessory is inserted into the accommodating groove, corresponding legs on the accessory can contact the legs at the bottom portion of the slot, so as to implement electrical connection between the accessory and the electronic device, thereby implementing data transmission between the accessory and the electronic device.

The operation process of the above electronic device will be described below.

When the electronic device displays a first display interface, an accessory such as a physical keyboard is placed by a user on the display unit and is supported by the bearing structure 30 on the first side 21. At this time, the electronic device may execute confirmation through a Hall device, a light sensor etc. arranged on the first side 21. Then, the processor switches the display interface of the display unit to a second display interface, to enable the user to perform an input operation on the second display interface through the physical keyboard.

Further, when the user enters a dark environment, the electronic device may adjust a backlight of an area on the display unit corresponding to the first area of the second display interface according to ambient light information captured by the light sensor, to enable the backlight of the area to transmit through the light-transmission area on the physical keyboard, such as transparent characters on the keys. In this way, the user can clearly see the characters on the keys, so as to perform an input operation.

The technical solutions according to the above embodiments of the present disclosure provide at least the following technical effects or advantages.

The electronic device includes: at least one electronic element, at least including a first element; a main body, in which the at least one electronic element is arranged, a first part of the first element being exposed on a first surface of the main body; and a bearing structure arranged on a first side of the main body, a height value of the first side being greater than height values of remaining parts of the main body excluding the first side, wherein the bearing structure supports an accessory on the first side of the main body when the accessory is placed on the main body. That is, once an accessory such as a physical keyboard, a protective cover etc. is directly placed on the main body to be supported by the bearing structure, the accessory can be physically connected to the electronic device, without adding other connection structures. Therefore, it effectively solves the technical problem in the related art that a structure of the electronic device is complex. Further, a new form of electronic device with a simple structure and beautiful design appearance is provided, improving user experience.

Other embodiments of the present application provide a connecting part and an electronic device, to solve the technical problem in the related art that it needs to hold an electronic device in hand when the electronic device is in use, limiting the activity of the user's hands.

In order to solve the above technical problem, a general concept is proposed as follows in the other embodiments of the present application.

A connecting part includes: a lateral portion, a bottom portion and a top portion, wherein the bottom portion is connected to a first end face of the lateral portion; and the top portion is connected to a second end face on the lateral portion opposite to the first end face, the top portion being arranged opposite to the bottom portion so that an accommodating space is formed by the bottom portion, the lateral portion and the top portion; wherein the accommodating space is used to accommodate N electronic accessories, where N is greater than or equal to 1 and each of the N electronic accessories includes a body, an accommodated portion, and a flexible portion connected to the body and the accommodated portion; when accommodated portions of the N electronic accessories are placed in the accommodating space, flexible portions of at least one of the N electronic accessories deform under an external force, so that bodies of the at least one electronic accessory can rotate with respect to an end face on the bottom portion or top portion away from the lateral portion, to change positions of the bodies with respect to the accommodated portion.

An electronic device includes: a connecting part and N electronic accessories, wherein the connecting part includes a lateral portion, a bottom portion connected to a first end face of the lateral portion, and a top portion connected to a second end face on the lateral portion opposite to the first end face, the top portion being arranged opposite to the bottom portion so that an accommodating space is formed by the bottom portion, the lateral portion and the top portion; each of the N electronic accessories includes a body, an accommodated portion, and a flexible portion connecting the body to the accommodated portion, where N is greater than or equal to 1; when accommodated portions of the N electronic accessories are placed in the accommodating space, flexible portions of at least one of the N electronic accessories deform under an external force, so that bodies of the at least one electronic accessory can rotate with respect to an end face on the bottom portion or top portion away from the lateral portion, to change positions of the bodies with respect to the accommodated portion.

An accommodating space is formed by the bottom portion, the lateral portion and the top portion to accommodate the accommodated portions of the N electronic accessories, and the flexible portions of the at least one of the N electronic accessories deform under an external force, to enable the bodies of the at least one accessory to rotate with respect to an end face on the bottom portion or the top portion away from the lateral portion, so as to change positions of the bodies with respect to the accommodated portion. Thereby, the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

For better understanding the above technical solutions, the technical solutions will be described in detail below in injunction with accompanying drawings of the specification and specific embodiments.

Figure 6:
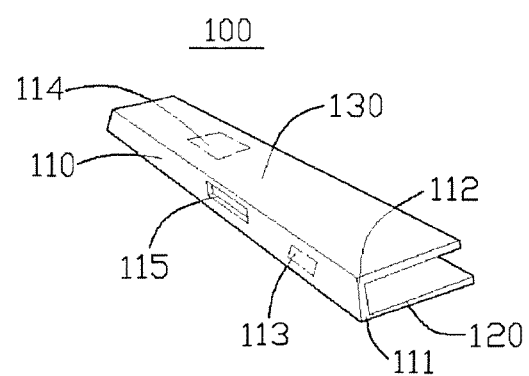
FIG. 6 is perspective schematic view of a connecting part according to an embodiment of the present disclosure.

As shown in FIG. 6, illustrated is a perspective schematic view of a connecting part 100 according to an embodiment of the present disclosure. The connecting part 100 includes a lateral portion 110, a bottom portion 120, and a top portion 130. The connecting part 100 may be integrally formed, or may also be formed by fixing the lateral portion 110, the bottom portion 120 and the top portion 130 together. In addition, the connecting part 100 may be made of a metal material or a plastic material.

The bottom portion 120 is connected to a first end face 111 of the lateral portion 110, i.e., the structure is formed by the bottom portion 120 extending from the first end face 111 of the lateral portion 110 in a first direction.

The top portion 130 is connected to a second end face 112 on the lateral portion 110 opposite to the first end face 111, i.e., the structure is formed by the top portion 130 extending from the second end face 112 in a second direction. The second direction is approximately parallel to the first direction. The top portion 130 is arranged opposite to the bottom portion 120, so that an accommodating space is formed by the bottom portion 120, the lateral portion 110 and the top portion 130. A section enclosed by the bottom portion 120, the lateral portion 110 and the top portion 130 is in a U shape.

Figure 7:
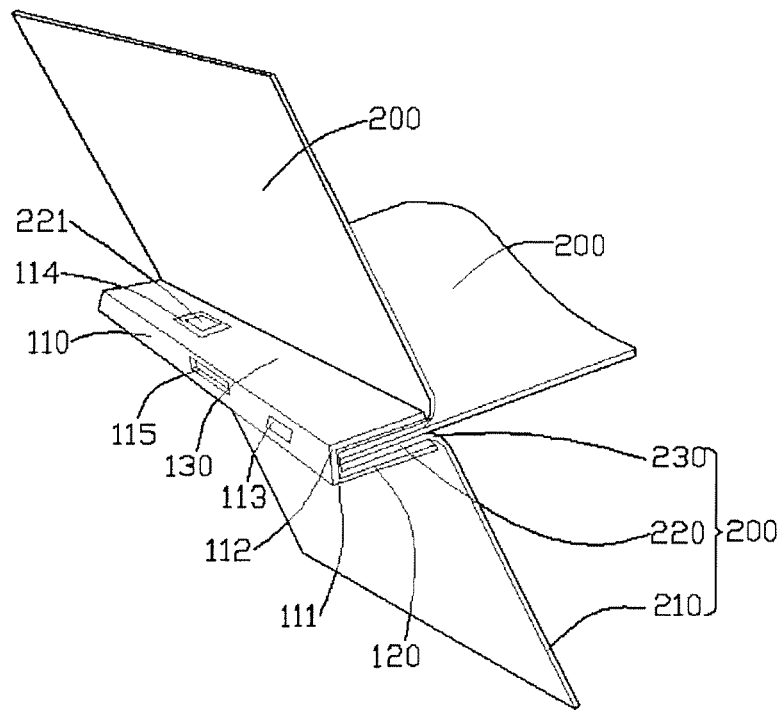
FIG. 7 is a usage state reference diagram of the connecting part illustrated in FIG. 6.

Also with reference to FIG. 7, the accommodating space is used to accommodate N electronic accessories 200, where N is greater than or equal to 1. Each of the N electronic accessories 200 includes a body 210, an accommodated portion 220 and a flexible portion 230 connected to the body 210 and the accommodated portion 220. Specifically, when N is greater than or equal to 2, the N electronic accessories 200 are separable and independent of each other. Therefore, positions of at least one of the N electronic accessories 200 may change with respect to other electronic accessories.

When the accommodated portions 220 of the N electronic accessories 200 are placed in the accommodating space, flexible portions 230 of at least one of the N electronic accessories 200 deform under an external force, so that bodies 210 of the at least one electronic accessory can rotate with respect to an end face on the bottom portion 120 or top portion 130 away from the lateral portion 110, to change positions of the bodies 210 with respect to the accommodated portion 220.

An accommodating space is formed by the bottom portion 120, the lateral portion 110 and the top portion 130 to accommodate the accommodated portions 220 of the N electronic accessories 200, and the flexible portions 230 of at least one of the N electronic accessories 200 deform under an external force, so that the bodies 210 of the at least one accessory can rotate with respect to an end face on the bottom portion 120 or the top portion 130 away from the lateral portion 110, to change positions of the bodies 210 with respect to the accommodated portion 220. Thereby, the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

In addition, a magnetic member 114 is arranged on the bottom portion 120, the lateral portion 110 and/or the top portion 130. When the N electronic accessories 200 are placed in the accommodating space 200, magnetic members 221 on at least one of the N electronic accessories 200 can be attracted to the magnetic member 114. A number of the magnetic members 114 may be set as needed. There may be multiple magnetic members instead of only one magnetic member. The magnetic member 114 is arranged on the bottom portion 120, the lateral portion 110 and/or the top portion 130, so that when the electronic accessories 200 are fixed in the accommodating space, the corresponding magnetic members 221 on the electronic accessories 200 can be attracted to the magnetic member 114, thereby preventing the electronic accessories 200 from being separated from the connecting part 100 during use and protecting the electronic accessories 200.

In addition, when there are multiple electronic accessories 200, i.e., N is greater than or equal to 2, and the N electronic accessories 200 are accommodated in the accommodating space, data transmission can be implemented among the N electronic accessories 200. The data transmission may be implemented in a wireless manner such as through WIFI or in a wired manner such as through a USB connection.

Further, through-holes 115 are formed on the lateral portion 110. When the at least one electronic accessory 200 is placed in the accommodating space, interfaces such as USB interfaces, audio/video interfaces of the at least one electronic accessory 200 can be exposed through the through-holes 115. Therefore, when the electronic accessories 200 are accommodated in the accommodating space of the connecting part 100, the interfaces of the electronic accessories 200 may be connected to the outside. The through-holes 115 are formed on the lateral portion 110 so that the interfaces of the electronic accessories 200 accommodated in the accommodating space can be exposed, to facilitate data communication with the outside or charge etc.

Figure 8:
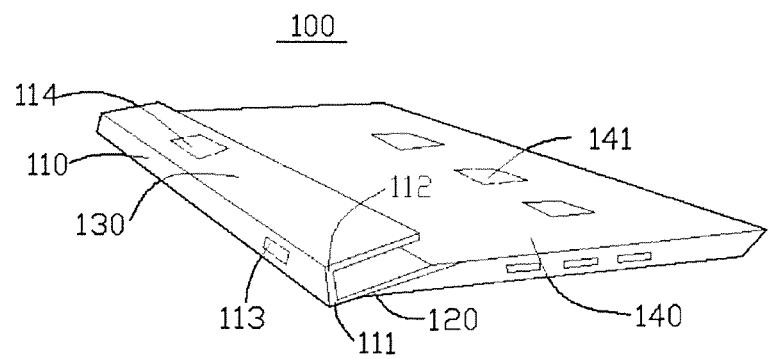
FIG. 8 is perspective schematic view of a connecting part according to an embodiment of the present disclosure.
Figure 9:
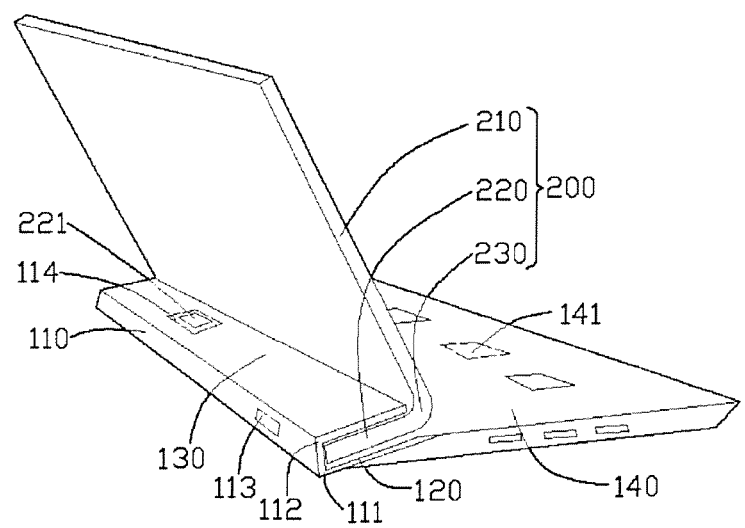
FIG. 9 is a usage state reference diagram of the connecting part in FIG. 8.

The connecting part 100 may be a part only with a connection function. Further, the connecting part 100 may also be a body with other functions, as shown in FIGS. 8 and 9. When the connecting part 100 is a body with other functions, the connecting part 100 further includes a functional main body 140 connected to an end face on the bottom portion 120 away from the lateral portion 110. An electric connector 113 is arranged on the lateral portion 110, the bottom portion 120 and/or the top portion 130. An electronic device 141 in the functional main body 140 is electrically connected to the electric connector 113.

When the at least one electronic accessory 200 is accommodated in the accommodating space, deformable parts of the at least one electronic accessory 200 deform under an external force, so that the body 210 can rotate with respect to an end face on the top portion 130 away from the lateral portion 110, and the at least one electronic accessory 200 can be electrically connected to the electric connector 113, so that the functional main body 140 can transmit data to the at least one electronic accessory 200. For example, the functional main body 140 may input information to the electronic accessory 200, or charge the electronic accessory 200 and the like.

An accommodating space is formed by the bottom portion 120, the lateral portion 110 and the top portion 130 to accommodate the accommodated portions 220 of the N electronic accessories 200, and the flexible portions 230 of at least one of the N electronic accessories 200 deform under an external force, so that the bodies 210 of the at least one accessory can rotate with respect to an end face on the bottom portion 120 or the top portion 130 away from the lateral portion 110, to change positions of the bodies 210 with respect to the accommodated portion 220. Thereby, the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

A magnetic member 114 is arranged on the bottom portion 120, the lateral portion 110 and/or the top portion 130, so that when the electronic accessories 200 are fixed in the accommodating space 200, the corresponding magnetic members on the electronic accessories 200 can be attracted to the magnetic member 114. thereby preventing the electronic accessories 200 from being separated from the connecting part 100 during use and protecting the electronic accessories 200.

The through-holes 115 are formed on the lateral portion 110 so that the interfaces of the electronic accessories 200 accommodated in the accommodating space can be exposed, to facilitate data communication with the outside or charge etc.

On basis of the same inventive concept, the present application further provides an electronic device. As shown in FIG. 7, illustrated is a structural schematic diagram of the electronic device. The electronic device includes a connecting part 100 and N electronic accessories 200.

The connecting part 100 includes a lateral portion 110, a bottom portion 120 connected to a first end face 111 of the lateral portion 110, and a top portion 130 connected to a second end face 112 on the lateral portion 110 opposite to the first end face 111. The top portion 130 is arranged opposite to the bottom portion 120, so that an accommodating space is formed by the bottom portion 120, the lateral portion 110 and the top portion 130.

Each of the N electronic accessories 200 includes a body 210, an accommodated portion 220, and a flexible portion 230 connected to the body 210 and the accommodated portion 220, where N is greater than or equal to 1. Specifically, when N is greater than or equal to 2, the N electronic accessories are separable and independent of each other. Therefore, positions of at least one of the N electronic accessories 200 change with respect to other electronic accessories.

When the accommodated portions 220 of the N electronic accessories 200 are placed in the accommodating space, flexible portions 230 of at least one of the N electronic accessories 200 deform under an external force, so that bodies 210 of the at least one electronic accessory 200 can rotate with respect to an end face on the bottom portion 120 or top portion 130 away from the lateral portion 110, to change positions of the bodies 210 with respect to the accommodated portion 220.

An accommodating space is formed by the bottom portion 120, the lateral portion 110 and the top portion 130 to accommodate accommodated portions 220 of the N electronic accessories 200, and the flexible portions 230 of at least one of the N electronic accessories 200 deform under an external force, so that the bodies 210 of the at least one accessory can rotate with respect to an end face on the bottom portion 120 or the top portion 130 away from the lateral portion 110, to change positions of the bodies 210 with respect to the accommodated portion 220. Thereby the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

Further, a magnetic member 114 is arranged on the bottom portion 120, the lateral portion 110 and/or the top portion 130. When the N electronic accessories 200 are placed in the accommodating space, the magnetic members 221 on at least one of the N electronic accessories 200 can be attracted to the magnetic member 114. A number of the magnetic members 114 may be set as needed. There may be multiple magnetic members instead of only one magnetic member. The magnetic member 114 is arranged on the bottom portion 120, the lateral portion 110 and/or the top portion 130, so that when the electronic accessories 200 are fixed in the accommodating space, the corresponding magnetic members on the electronic accessories 200 can be attracted to the magnetic member 114, thereby preventing the electronic accessories 200 from being separated from the connecting part 100 during use and protecting the electronic accessories 200.

Further, when there are multiple electronic accessories 200, i.e., N is greater than or equal to 2, and the N electronic accessories 200 are accommodated in the accommodating space, data transmission can be implemented among the N electronic accessories 200. The data transmission may be implemented in a wireless manner such as through WIFI or in a wired manner such as through a USB connection.

Further, through-holes 115 are formed on the lateral portion 110. When the at least one electronic accessory 200 is placed in the accommodating space, interfaces such as USB interfaces, audio/video interfaces of the at least one electronic accessory 200 can be exposed through the through-holes 115. Therefore, when the electronic accessories 200 are accommodated in the accommodating space of the connecting part 100, the interfaces of the electronic accessories 200 may be connected to the outside. The through-holes 115 are formed on the lateral portion 110 so that the interfaces of the electronic accessories 200 accommodated in the accommodating space can be exposed, to facilitate data communication with the outside or charge etc.

Further, in addition to being a part only with a connection function, the connecting part 100 may also be a body with other functions. As shown in FIG. 9, illustrated is a structural schematic diagram of another electronic device. When the connecting part 100 is a body with other functions, the connecting part 100 further includes a functional main body 140 connected to an end face on the bottom portion 120 away from the lateral portion 110. An electric connector 113 is arranged on the lateral portion 110, the bottom portion 120 and/or the top portion 130. An electronic device 141 in the functional main body 140 is electrically connected to the electric connector 113.

When the at least one electronic accessory 200 is accommodated in the accommodating space, deformable parts of the at least one electronic accessory 200 deform under an external force, so that the bodies 210 can rotate with respect to an end face on the top portion 130 away from the lateral portion 110, and the at least one electronic accessory 200 can be electrically connected to the electric connector 113, so that the functional main body 140 can transmit data to the at least one electronic accessory 200. For example, the functional main body 140 may input information to the electronic accessory 200, or charge the electronic accessory 200 and the like.

An accommodating space is formed by the bottom portion 120, the lateral portion 110 and the top portion 130 to accommodate accommodated portions 220 of the N electronic accessories 200, and flexible portions 230 of at least one of the N electronic accessories 200 deform under an external force, so that the bodies 210 of the at least one accessory can rotate with respect to an end face on the bottom portion 120 or the top portion 130 away from the lateral portion 110, so as to change positions of the bodies 210 with respect to the accommodated portion 220. Thereby the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

A magnetic member 114 is arranged on the bottom portion 120, the lateral portion 110 and/or the top portion 130, so that when the electronic accessories 200 are fixed in the accommodating space, the corresponding magnetic members on the electronic accessories 200 can be attracted to the magnetic member 114, thereby preventing the electronic accessories 200 from being separated from the connecting part 100 during use and protecting the electronic accessories 200.

Through-holes 115 are formed on the lateral portion 110 so that the interfaces of the electronic accessories 200 accommodated in the accommodating space can be exposed, to facilitate data communication with the outside or charge etc.

In addition, in some embodiments of the present application, the electronic accessories 200 and the connecting part 100 may be integrally formed, or the electronic accessories 200 and the functional main body 140 may be integrally formed, or all of the electronic accessories 200, the connecting part 100 and the functional main body 140 are integrally formed. Other aspects are similar to those illustrated in FIG. 9. That is, the accommodated portions 220 of the electronic accessories 200 and the functional main body 140 and one or more of the top portion 130, the lateral portion 110 and the bottom portion 120 of the connecting part 100 may be integrally formed.

In addition, in some embodiments of the present application, in the case illustrated in FIG. 9, when an external force is applied to the electronic accessory 200, for example, when a user pushes the body 210 of the electronic accessory 200 which may be used as a display screen in an anti-clockwise direction in FIG. 9 with one hand, due to the existence of the top portion 130 of the connecting part 100 (which protrudes from the main body 140 of the electronic device), the flexible portion 230 of the electronic accessory 200 deforms at a position corresponding to an outer edge of the top portion 130 away from the lateral portion 110, so that the body 210 can rotate with respect to the main body 140 with the outer edge of the top portion 130 as an axis, to form a usage state after the flexible portion 230 deforms as illustrated in FIG. 9. In this way, the user can cause the body 210 to rotate with respect to the main body 140 with a single-hand operation, without the aid of the other hand of the user, since the outer edge of the top portion 130 away from the lateral portion 110 plays a role of the other hand.

The electronic device provided in some embodiments of the present disclosure comprises: at least one electronic element, comprising at least a first element; a main body, in which the at least one electronic element is arranged, a first part of the first element being exposed on a first surface of the main body; and a bearing structure arranged on a first side of the main body, a height value of the first side being greater than height values of remaining parts of the main body excluding the first side, wherein the bearing structure supports an accessory on the first side of the main body when the accessory is placed on the main body. That is, once an accessory such as a physical keyboard, a protective cover etc. is directly placed on the main body to be supported by the bearing structure, the accessory can be physically connected to the electronic device, without adding other connection structures. Therefore, it effectively solves the technical problem in the related art that a structure of the electronic device is complex. Further, a new form of electronic device with a simple structure and beautiful design appearance is provided, improving user experience.

In addition, when the electronic device is perpendicular to the ground or is at an angle greater than 45 degree with respect to the ground, the bearing structure can support the accessory, so that the accessory will not slip off and separate from the first surface of the electronic device, improving user experience.

Some other embodiments of the present disclosure provide the following beneficial effects:

an accommodating space is formed by the bottom portion, the lateral portion and the top portion to accommodate accommodated portions of the N electronic accessories, and flexible portions of at least one of the N electronic accessories deform under an external force, so that the bodies of the at least one accessory can rotate with respect to an end face on the bottom portion or the top portion away from the lateral portion, to change positions of the bodies with respect to the accommodated portion. Thereby the accessories can be adjusted to be at different usage angles for the user. This solves the technical problem in the related art that it needs to hold the electronic accessories in hand when the electronic device is in use, limiting the activity of the user's hands, and achieves the purpose of releasing a user's hands.

A magnetic member is arranged on the bottom portion, the lateral portion and/or the top portion, so that when the electronic accessories are fixed in the accommodating space, the corresponding magnetic members on the electronic accessories can be attracted to the magnetic member, thereby preventing the electronic accessories from being separated from the connecting part during use and protecting the electronic accessories.

Through-holes are formed on the lateral portion so that the interfaces of the electronic accessories accommodated in the accommodating space can be exposed, to facilitate data communication with the outside or charge etc.

Although preferable embodiments of the present disclosure have been described, additional changes and modifications can be made to these embodiments by those skilled in the art upon learning the basic creative concepts. Therefore, the appended claims are intended to be construed as comprising the preferable embodiments and all changes and modifications that fall into the scope of the present disclosure.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations.

What is claimed is:

1. A holding element configured to hold an accessory on an electronic device, the holding element comprising:
    an accommodating groove configured to receive a first part of the accessory to hold the accessory on the electronic device,
    wherein at least a part of the holding element rises up from the electronic device,
    wherein the accessory is able to be deformed only at a position corresponding to an outer edge of the rised part of the holding element when an external force is applied to the accessory, so that a second part of the accessory which is not accommodated in the accommodating groove can rotate, with respect to the first part of the accessory, about the outer edge of the rised part as an axis, to change the position of the second part with respect to the first part.

2. The holding element according to claim 1, wherein the accommodating groove comprises:
    a lateral portion;
    a bottom portion connected to a first end face of the lateral portion; and
    a top portion connected to a second end face on the lateral portion opposite to the first end face, the top portion being arranged opposite to the bottom portion so that an accommodating space is formed by the bottom portion, the lateral portion and the top portion.

3. The holding element according to claim 2, wherein the accommodating space is used for accommodating N electronic accessories, where N is greater than or equal to 1, and each of the N electronic accessories comprises a body, an accommodated portion, and a flexible portion which connects the body to the accommodated portion;
    wherein when the accommodated portions of the N electronic accessories are placed in the accommodating space, the flexible portion of at least one of the N electronic accessories deforms under an external force, so that the body of the at least one electronic accessory can rotate with respect to an end face of the bottom portion or the top portion away from the lateral portion to change the position of the body with respect to the accommodated portion.

4. An electronic device, comprising:
a main body; and
a holding element arranged on a first side of the main body, with at least a part of the holding element rising up from a first surface of the main body, wherein the holding element is configured to hold an accessory on the main body by receiving a first part of the accessory, wherein the accessory is able to be deformed only at a position corresponding to an outer edge of the rised part of the holding element when an external force is applied to the accessory, so that a second part of the accessory which is not received by the holding element can rotate, with respect to the first part of the accessory, about the outer edge of the rised part as an axis, to change the position of the second part with respect to the first part.

5. The electronic device according to claim 4, wherein the first side of the main body and the holding element are higher than remaining parts of the main body.

6. The electronic device according to claim 4, wherein the holding element comprises an accommodating groove configured to receive at least a part of the accessory to hold the accessory on the main body.

7. The electronic device according to claim 6, wherein the first surface of the main body is configured as a wall limiting one side of the accommodating groove.

8. The electronic device according to claim 6, wherein the accommodating groove comprises:
a lateral portion;
a bottom portion connected to a first end face of the lateral portion; and
a top portion connected to a second end face on the lateral portion opposite to the first end face, the top portion being arranged opposite to the bottom portion so that an accommodating space is formed by the bottom portion, the lateral portion and the top portion.

9. The electronic device according to claim 8, wherein the accommodating space is used for accommodating N electronic accessories, where N is greater than or equal to 1, and each of the N electronic accessories comprises a body, an accommodated portion, and a flexible portion which connects the body to the accommodated portion;
wherein when the accommodated portions of the N electronic accessories are placed in the accommodating space, the flexible portion of at least one of the N electronic accessories deforms under an external force, so that the body of the at least one electronic accessory can rotate with respect to an end face of the bottom portion or the top portion away from the lateral portion to change the position of the body with respect to the accommodated portion.

10. The electronic device according to claim 6, wherein a data transmission means is arranged in the accommodating groove, and the data transmission means is connected to transmission means on the accessory when the accessory is inserted into the accommodating groove, so that data transmission can be performed between the electronic device and the accessory.

11. The electronic device according to claim 4, wherein the holding element is a protrusion which extends from the first side towards a second side of the main body, so that the height value of the first side is greater than the height values of the remaining parts of the main body excluding the first side, the second side being opposite to the first side.

12. The electronic device according to claim 4, further comprising:
a display component; and
a processor connected to the display component to control a display interface of the display component.

13. The electronic device according to claim 12, wherein when the accessory is a keyboard comprised of N physical keys and the keyboard is located on the display component, the processor controls the display component to switch from a first display interface to a second display interface, where N is an integer greater than or equal to 1 and the second display interface is an input interface for the keyboard.

14. The electronic device according to claim 13, wherein a first area of the second display interface is masked by the keyboard, so that a backlight from a display area on the display component corresponding to the first area can transmit through a light-transmission area of the keyboard.

15. The electronic device according to claim 12, wherein the processor controls brightness of the display area based on information collected by a light sensor.

16. The electronic device according to claim 14, wherein there are M virtual contact points on the first area, and the physical keys are pressed by an external force to contact the virtual contact points when an input operation is performed on the physical keys, so that the electronic device can acquire the input operation, where M is an integer greater than or equal to 1.

17. The electronic device according to claim 9, wherein a magnetic member is arranged on the bottom portion, the lateral portion and/or the top portion, and a magnetic member on at least one of the N electronic accessories can be attracted to the magnetic member when the N electronic accessories are placed in the accommodating space.

18. The electronic device according to claim 9, wherein when N is greater than or equal to 2 and the N electronic accessories are accommodated in the accommodating space, data transmission can be performed among the N electronic accessories.

19. The electronic device according to claim 9, wherein a through-hole is formed in the lateral portion, and an interface of the at least one electronic accessory can be exposed through the through-hole when the at least one electronic accessory is placed in the accommodating space.

20. The electronic device according to claim 9, wherein when N is greater than or equal to 2, the N electronic accessories are separable and independent of each other.

21. An electronic device, comprising:
a main body having a protrusion part formed on its first surface; and
N electronic accessories each comprising a body, a fixed portion, and a flexible portion which connects the body to the fixed portion, where N is greater than or equal to 1, the fixed portion is fixed to the main body and an accommodating groove being formed by the protrusion part and the rest of the main body;
wherein the flexible portion of at least one of the N electronic accessories deform only at a position corresponding to an outer edge of a rised part of a holding element of the body when an external force is applied to the electronic accessory, so that the flexible portion of
electronic accessory which is not accommodated in the accommodating groove can rotate, with respect to the fixed portion of the electronic accessory, about the outer edge of the rised part as an axis, to change the position of the fixed portion with respect to the flexible portion.

22. The electronic device according to claim 21, wherein the protrusion part is arranged on a first side of the main body, and wherein the fixed portions of the electronic accessories are fixed to the accommodating groove.

23. The electronic device according to claim 22, wherein the accommodating groove comprises:
   a lateral portion;
   a bottom portion connected to a first end face of the lateral portion; and
   a top portion connected to a second end face on the lateral portion opposite to the first end face, the top portion being arranged opposite to the bottom portion so that an accommodating space is formed by the bottom portion, the lateral portion and the top portion.

* * * * *